June 13, 1933.  N. M. ERDAHL  1,913,705
TRACTOR RUNNING GEAR
Filed May 6, 1930  2 Sheets-Sheet 1

Witness
N. F. McKnight

Inventor.
Nicholai M. Erdahl.
by Burton & Burton
his Attorneys.

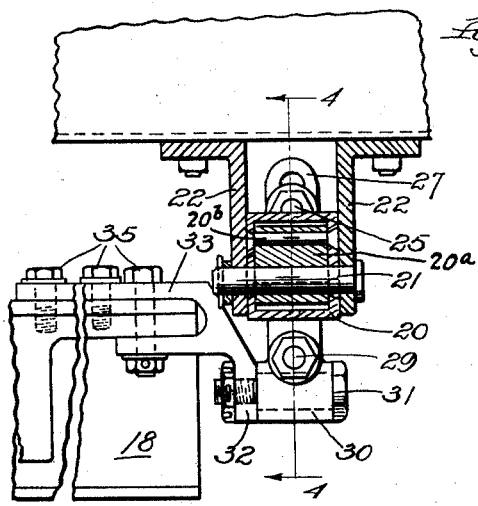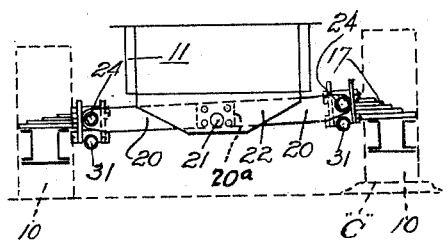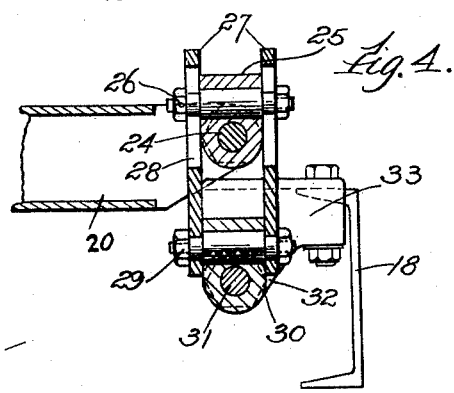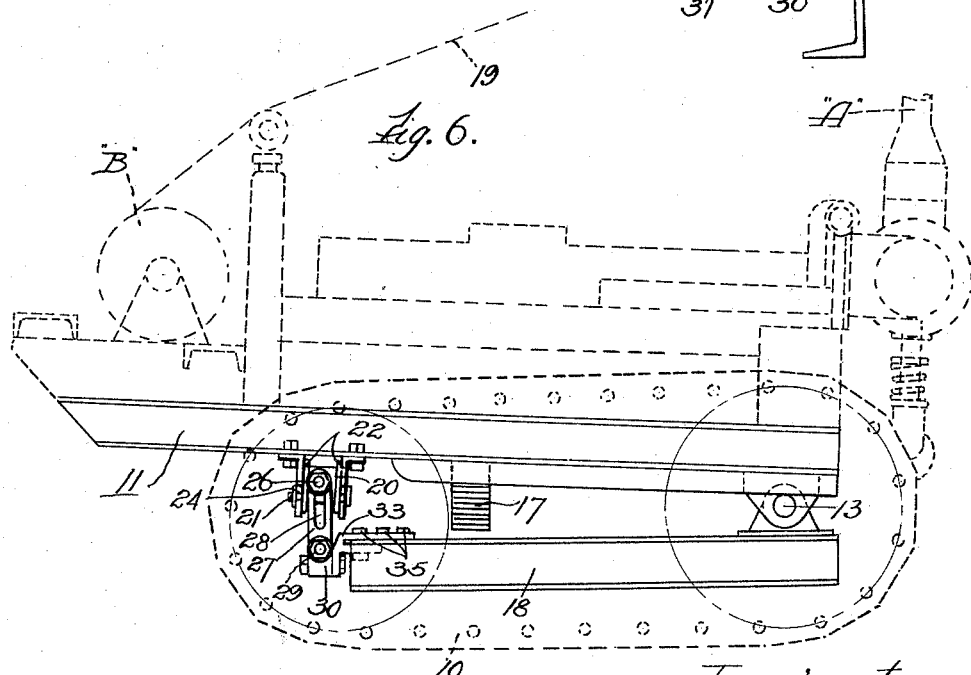

Patented June 13, 1933

1,913,705

UNITED STATES PATENT OFFICE

NICHOLAI M. ERDAHL, OF EDGERTON, WISCONSIN, ASSIGNOR TO HIGHWAY TRAILER COMPANY, OF EDGERTON, WISCONSIN, A CORPORATION OF WISCONSIN

TRACTOR RUNNING GEAR

Application filed May 6, 1930. Serial No. 450,169.

This invention relates to vehicles of the tractor type having a pair of transversely spaced crawler units pivoted at one end to one end of the vehicle main frame with load lifting mechanism on said frame adjacent the pivotal connection. The object of the invention is the provision of means positively engaging the other end of the vehicle main frame with the crawler units, arranged to permit a limited amount of vertical separation of said end of the main frame with respect to the crawler units, permitting unhampered spring action, and at the same time obtaining full benefit of the weight of said crawler units as ballast. It consists in certain features and elements of construction in combination as herein shown and described and as indicated by the claims.

In the drawings:

Figure 3 is an enlarged vertical section taken substantially as indicated through the pivot of the equalizing beam at line 3—3 on Figure 2.

Figure 4 is a vertical transverse section through the knuckle connections at the end of the equalizing beam, taken substantially as indicated at line 4—4 on Figure 3.

Figure 5 is a diagrammatic end elevation of a portion of the vehicle, illustrating one of the crawler units traversing an upward projection in the road bed and showing the effect on the equalizing beam.

Figure 6 is a diagrammatic view in side elevation, with the major portion of the vehicle shown in dotted outline and illustrating the main frame at its upward limit of movement with respect to the crawler units.

Figure 1:
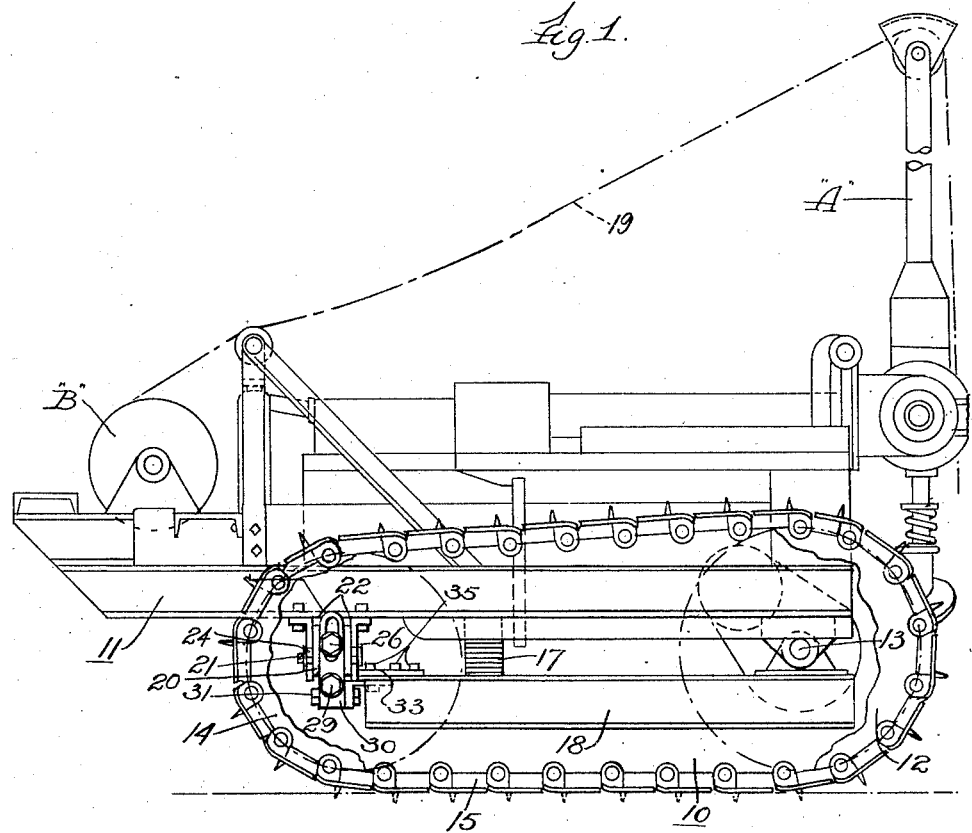
Figure 1 is a side elevation, showing rather diagrammatically a vehicle embodying the present invention.
Figure 2:
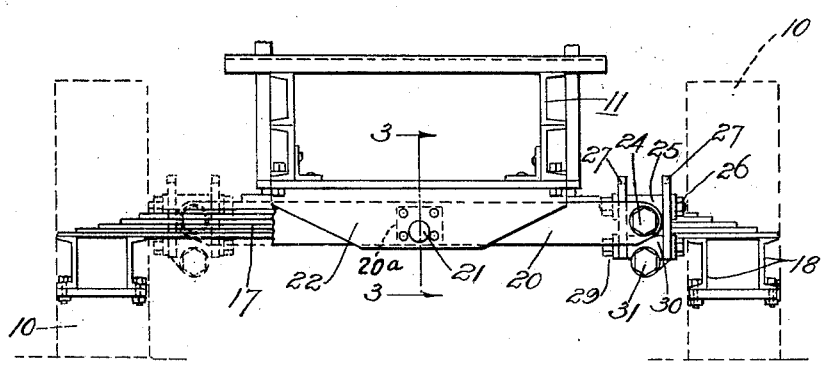
Figure 2 is a fragmentary end view in elevation with the crawler units indicated in dotted outline and with a portion of the equalizing beam broken away to indicate the relation of the supporting spring of the main frame to the supporting structure of the crawler units.

Vehicles of the type with which the present invention is concerned include a pair of transversely spaced crawler mechanisms or units indicated at 10, arranged for supporting therebetween a main frame, 11, on which are carried a power plant and other appurtenances. The present invention is particularly directed to that class of vehicles of the crawler type in which the crawler units are pivotally connected to the vehicle main frame at one end about a transverse horizontal axis—preferably at the driving end—the other ends of the crawler units being free to "float" under control of spring means, so as to permit a limited amount of vertical movement of said free ends of the crawler units for accommodation to irregularities in the road bed. As illustrated in the drawings, each crawler unit includes a driving wheel, 12, which is mounted for rotation about a transverse, horizontal axle, 13, which also serves as the axis for the pivotal connection between the main frame, 11, and the crawler unit, 10. At the free or "floating" ends of the crawler units are idler wheels, 14, and trained around the respective idler and driving wheels of each of the crawler units is a flexible belt, 15, of the creeper shoe type adapted to secure traction with the ground.

The end of the main frame remote from the pivotal connection is preferably supported yieldingly on the crawler units; and as herein shown, the yielding support consists of a transverse leaf spring, 17, connected to the under side of the main frame and having its outer ends resting upon but not positively engaged with the structural supports of the crawler units which are herein shown as a pair of transversely spaced longitudinally extending channel members, 18, suitably connected and braced together in any convenient manner.

When vehicles of this character are employed as draft units for pulling in a substantially horizontal direction they ordinarily experience no difficulty by reason of the fact that the crawler units are pivoted at one end with the other ends "floating" to accommodate irregularities in the road bed. But when the main frame is provided with apparatus in the nature of a derrick or boom, "A", having a power operated draft cable, 19, associated with a winding drum "B", which is connected to the power plant or other source of power, for lifting material, and the boom or derrick is mounted as shown on the frame at the end adjacent the pivotal connection, it becomes necessary to insure a proper balance of the load being lifted by the derrick, to provide some positive engagement between the remote end of the main frame and the "floating" ends of the crawler units, so that the weight of these crawler units may be employed as ballast for assisting in lifting greater weights by the derrick.

At the end of the vehicle remote from the pivotal connection of the main frame to the crawler units I provide a transversely extending equalizing beam, 20, pivoted centrally about a horizontal longitudinally extending axis, 21, in a yoke formed by a pair of spaced transversely extending angle members, 22, secured to the under side of the main frame, 11. This equalizing beam, as herein shown, is a hollow member of rectangular cross section having each of its ends formed to provide a clevis or yoke. The hollow beam, 20, has mounted within it a block, 20ª, secured to the beam as indicated by the riveted bolt, 20ᵇ, said block constituting reenforcement of the tubular beam at the pivot bearing, of which said reenforcing block thus becomes a part.

Each of the yoke ends of said beam is pivotally connected at a longitudinal, horizontal axis by a bolt, 24, to a block, 25, hereinafter referred to as the knuckle which is provided with a transversely horizontal and floating pivotal connection by means of a bolt, 26, to a pair of vertically extending parallel links, 27, having vertical slots, 28, in which the bolt, 26, is engaged. The lower ends of each pair of links, 27, are pivotally connected by a bolt, 29, (parallel to the bolt, 26,) to a second knuckle, 30, which is disposed directly below the knuckle, 25; and this second knuckle is pivotally connected by a bolt, 31, (at an axis perpendicular to the bolt, 29, and parallel to the bolt, 24,) to a laterally and inwardly offset lug, 32, of a supporting bracket, 33, which is rigidly secured by means of bolts and machine screws, 35, to the top flange of the innermost or adjacent channel member, 18, of the crawler unit, as shown in Figures 3 and 4.

By reason of the slotted links, 27, the floating ends of the crawler units are permitted a limited amount of vertical movement about the fixed pivotal connections of their driving ends, which allows for flexure of the spring, 17; and as seen in Figure 5, one of the crawler units (indicated in dotted outline) is shown traversing an upwardly protruding obstacle at "C" on the road bed. Since the spring, 17, merely rests upon the members, 18, of the crawler units, the slotted links, 27, supplement the springs as a connection between the frame, 11, and the crawlers, 10, 10, whenever the load on the lifting mechanism at A tends to separate the main frame, 11, from the crawlers. If the bolts, 26, by which the slotted links, 27, are connected to the frame, 11, were merely rigid with the frame at each side thereof, it will be evident that the up-and-down movement at the free end of either crawler, 10, would be limited by the length of the slot, 28, in the link, 27, so that in traversing uneven ground as indicated in Figure 5, if one crawler should be lifted to bring the bottom of its slot, 28, in contact with the bolt, 26, it would then tend to lift the main frame, 11, bodily, although the lifting strain would be thrown wholly on the one bolt at the rising side of the machine. This action is avoided by the use of the equalizer beam, 20, which carries the bolts, 26, at its opposite ends.

It will be understood that normally the front end of the main frame is yieldingly supported by the spring, 17, with the bolts, 26, at the ends of the beam, 20, riding freely in the links, 27, adjacent the lower ends of the slots, 28; and when one of the crawlers is lifted or raised, as in Figure 5, the spring, 17, which is connected at its center to the main frame, 11, acts as a lever for raising said frame; the upward movement of the main frame being about half the amount of movement of the raised crawler. When one crawler is lifted so high that its approach to the frame brings the lower end of the slot, 28, into engagement with the bolt, 26, a further range of upward movement is still permitted by the rocking of the beam, 20, which swings the opposite end of the beam downward so as to carry its other bolt, 26, downwardly in the slot, 28, of the link, 27, associated with the other crawler. Then the equalizer beam, acting as a lever on which the frame, 11, is supported at 21, will raise said frame; but even then the frame, 11, being supported at the mid-point of the beam, 20, is lifted by only one half the amount of this additional upward movement of the crawler.

However, when the load on the frame is so great as to overcome the spring, 17, the additional load unsupported by said spring will be carried by the bolts, 26, engaging the bottom of the slots, 28, of the links, 27. Thus, when one of the crawlers is raised, both the beam, 20, and spring, 17, act as levers to raise the main frame; and the beam being fulcrumed on the other crawler by the bolt, 26, at said end carries its share of the load by its pivotal connection to the fulcrum at 21.

In most cases in which the lifting strain at A tends to raise the opposite end of the frame, 11, the equalizer beam, 20, will pick up both crawlers simultaneously after the frame, 11, has tilted upwardly far enough to take up the play in the slotted links, 27, and this is the primary function of said links. The action of the equalizer, however, causes the links to interfere less with the normal action of the spring, 17, and with the independent accommodation of the crawlers to an irregular ground, than if these links were coupled directly to the frame, 11.

I claim:

1. The combination with a pair of transversely spaced crawler units, of a frame and a pivot on which it is supported at one end on said crawler units, and spring means located at a distance from said pivot and arranged for yieldingly supporting the other end of the frame on said crawler units; a transversely disposed beam carried on the end of the frame remote from the pivot, and means positively engaging the ends of said beam with the respective crawler units, said means being constructed and arranged for permitting a limited range of vertical movement of the crawler units relative to the frame and independently of each other; said last mentioned means including a knuckle pivotally connected to each crawler unit for swivelling about a horizontal longitudinal axis, and upwardly extending link members having floating connection with the ends of the beam and having their lower ends pivotally connected to said knuckles about transverse axes.

2. In a vehicle, the combination with a pair of transversely spaced crawler units, a frame pivotally supported at one end of the crawler units, and spring means located at a distance from the pivot support and arranged for yieldingly supporting the other end of the frame on the crawler units, of a transversely disposed beam pivotally mounted at the end of the frame remote from the pivot support about a horizontal axis parallel to and adjacent the longitudinal center of the vehicle, and means connecting the ends of the beam with the adjacent ends of the crawler units, and arranged for permitting a limited range of vertical movement of the adjacent ends of the crawler units independently of each other, each of said connecting means including a knuckle pivotally connected to a crawler unit for swivelling about a horizontal longitudinal axis, a pair of transversely spaced upwardly extending slotted link members pivoted at their lower ends to the knuckle at an axis transverse to that of the knuckle pivot, a block pivoted between the pair of links and vertically movable therebetween and having its pivot engaged in said slots each end of said beam being forked to straddle at least one of the links and having a pivotal connection to said block at a horizontal longitudinal axis.

3. In the construction defined in claim 1, said beam having a pivot connection with the frame and being of hollow tubular formation and having a bearing block secured therein providing reenforcement for the pivot connection of the beam to the frame.

NICHOLAI M. ERDAHL.